Feb. 23, 1943. C. W. CLARKSON 2,311,734
SEARCHLIGHT
Filed Sept. 15, 1941
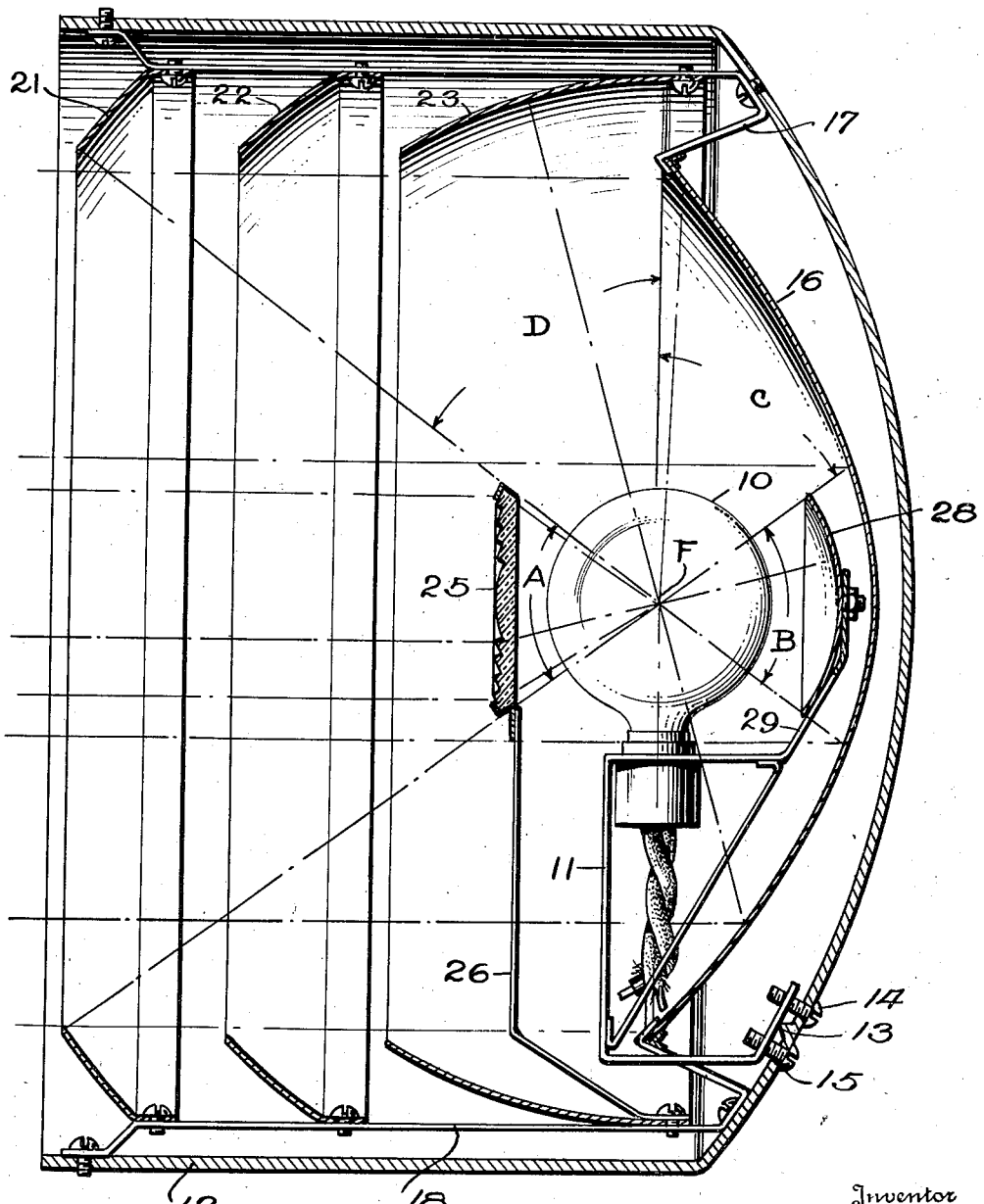
Inventor
C. W. Clarkson
By
Attorney Patented Feb. 23, 1943

2,311,734

UNITED STATES PATENT OFFICE 2,311,734

SEARCHLIGHT

Clarence W. Clarkson, Washington, D. C.

Application September 15, 1941, Serial No. 410,901

1 Claim. (Cl. 240—41.3)

(Granted under the act of March 3, 1883, as amended April 30, 1928; 370 O. G. 757)

The invention described herein, if patented, may be manufactured and used by or for the Government for governmental purposes without the payment of any royalty thereon.

The present invention relates to illuminating devices such as searchlights, and more specifically to a light projector incorporating a new and novel optical system and novel combination of reflecting and refracting instrumentalities.

One of the principal objects of the present invention is to provide a light projector of novel optical design whereby all of the light rays projected throughout the entire spherical angle around a light source may be redirected to form a single beam of substantially parallel rays.

A further object of the invention is to provide a light projector including instrumentalities cooperating to project a substantially cylindrical beam in combination with instrumentalities adapted to project a substantially annular beam surrounding the first mentioned beam and cooperating with it to form, in effect, a single, solid beam.

A further object of the invention is to provide, in combination with a light source, a condensing lens and complementary spheric reflecting surface to form a cylindrical light beam and a parabolic focusing reflector and complementary spherical reflecting surfaces adapted to provide an annular beam surrounding and cooperating with the aforementioned cylindrical beam.

A further object of the invention is to provide a light projector including a light source and a parabolic focusing reflector arranged to intercept rays directly from the source and to project them as a beam with a plurality of spherical reflecting surfaces positioned in front of the focusing reflector and adapted to intercept rays of light from the light source and reflect them directly backwardly through the light source and center of focus of the parabolic reflector, whereby they will be projected from the reflector in parallel relationship to intensify the first-mentioned beam A further object of the invention is to provide an improved mechanical design for a light projector including the above features and having means for focusing the cooperating elements of the projector to provide a substantial parallel beam projector or a divergent beam flood light.

A further object of the invention is to provide a light projector of improved mechanical design whereby a plurality of reflectors and lenses are mounted within a single casing on brackets such that they intercept and focus all of the rays of light projected from a light source, and yet permit free circulation of air around the light source and between the several reflectors.

In the prior art it has been customary to construct light projectors of the type ordinarily used for searchlights and similar uses by arranging a light source such as an incandescent lamp or electric arc at the focal center of a single parabolic reflector. Customarily, a spherical reflector is placed in front of the light source so that the rays diverging in a forwardly direction from the source are redirected back across their point of origin and into the reflector. This mode of construction is inherently inefficient for two reasons; first, the presence of the reflector in front of the light source necessarily requires that the beam projected will be of annular formation and hollow in its center as it leaves the projector, thus rendering the central portion of the main parabolic reflector inoperative. Secondly, it has been common practice to make no provision for certain beams projected from the source, except to prevent the unwanted dispersion of the beam by coating the interior of the projector casing with some non-reflecting substance to absorb the light. When so constructed, a projector is not only inefficient in that it makes no use of a large percentage of the rays projected from the light source, but also is objectionable since these rays are absorbed by the non-reflecting surfaces, and generate a high degree of heat in the projector housing.

In practicing the principles of the present invention it is proposed to overcome the aforementioned difficulties by providing a light projector having a plurality of cooperating reflecting and refracting instrumentalities, each arranged to utilize certain definitely specified portions of the light rays emitted from a single light source and each arranged to cooperate with the others toward the provision of a single beam. It is contemplated that this result will be best accomplished by the combination of a condensing lens arranged to focus all of the light directly intercepted by the lens into a single beam, and a parabolic reflector arranged to focus all of its intercepted light into an annular form of beam entirely surrounding the beam projected through the lens.

The beam projected through the lens is intensified by a spherical complementary mirror or reflector positioned on the opposite side of the light source from the position of the lens and having its center of curvature at the light source so that it will redirect all intercepted light directly back through the light source and into the lens, where it will be concentrated to intensify the beam. The light rays emitted from the source which do not fall on either the lens, the parabolic reflector, or the spherical reflector just mentioned, are intercepted by one or more spherical reflecting surfaces arranged within the casing of the projector. These rays are projected directly back, through the light source, and against the parabolic reflector to intensify the annular beam.

Referring now more particularly to the drawing accompanying this specification and constituting a central sectional view through a projector constructed according to the teachings of this invention, light source 10, which may be an incandescent lamp or electric arc, is supported by any suitable type of mounting bracket 11 arranged within a generally cylindrical projector housing 12. The bracket 11 is adjustably mounted by means of a pivot point 13 and mounting screws 14 and 15 so that it may be adjusted forwardly or backwardly along the general axis of the housing 12, so that the filament of the lamp may be accurately positioned at the focal point F of the parabolic focusing reflector 16.

The reflector 16 is preferably mounted in spaced relationship with the casing 12 and, to this end, a plurality of mounting brackets 17 and 18 are provided. These mounting brackets 17 and 18 also serve to support a series of spherical reflectors 21, 22 and 23. Each of the spherical reflectors 21, 22 and 23 is of substantially annular shape, and forms a section of a sphere having its center at the focal center F of the parabolic focus reflector 16. It will be noted that the inside diameter of the front of each of these reflectors is approximately the maximum diameter of the parabolic reflector 16 so that parallel light rays projected directly ahead from the reflector 16 will not be intercepted by the reflectors 21, 22 and 23. The reflectors 21, 22 and 23 are mutually cooperative, however, and meet each other to extend over and intercept all of the spherical angle surrounding the point F that is not intercepted by the reflectors 16 or 28, or the lens 25.

The condensing lens 25 is mounted on a suitable bracket 26 secured to the bracket 18 at a position closely adjacent to, and in front of the light source 10, so that it will intercept all of the divergent rays of light included within the angle A. The condenser lens 25 has been illustrated as an echelon lens, but it will be understood as within the scope of this invention to provide any other simple or compound type of well-known lens customarily used for a similar purpose. The focal length of the lens 25 is such that its center of focus will fall at the point F, coincident with the center of focus of the reflector 16.

A small spherical reflector 28 is mounted on the arm 29 extending upwardly from the bracket 11 in a position between the light source 10 and the parabolic focusing reflector 16. The radius of the reflector 28 is equivalent to the distance it is spaced from the center of the light source 10, so that the center of the reflector 28 will be coincident with the center of the light source at all times. With this arrangement, when the light source is adjusted to lie at the focal point F, the center of the reflector 28 will also be coincident with the focal center of the lens 25 and the parabolic reflector 16.

The optical system of the projector operates in the following manner:

All of the rays of light projected forwardly within the angle A and directly intercepted by the lens 25 will be refracted and formed into a cylindrical beam approximately the diameter of the lens and consisting of parallel rays projected straight ahead along the axis of the lens. All rays of light projected from the light source rearwardly within the spherical angle B will be intercepted by the reflector 28 and will be reflected directly back along the line from whence they came, through the light source 10 and across the focal point F to the lens 25 where they will also be refracted and included in the central cylindrical beam. As thus far described, the lens 25 and spherical reflector 28 intercept all of the light beams projected in a forward cone subtended by the lens and a complementary rearward cone subtended by the reflector 28. All of these rays are concentrated into a single beam. The cooperating reflectors 16, 21, 22, and 23 are arranged to redirect all other rays of light emitted from the source 10 into an annular beam surrounding and cooperating with the beam above described.

All of the rays of light emitted from the source 10 within and intercepted by the spherical angle C will fall upon and be intercepted by the parabolic focusing reflector 16 and will be projected forwardly in an annular beam of substantially parallel rays surrounding the cylindrical beam previously described. All rays of light projected anywhere within the spherical angle D herein will be intercepted by one of the spherical reflectors 21, 22 or 23, and will be redirected straight back, through the light source and the center of focus of the parabolic reflector 16, and thence forwardly in parallel relationship with, and as a part of the annular beam, thus giving added intensity to this beam.

From the foregoing description, it should be apparent that all rays of light projected from the light source 10 are directed into a single beam comprising a central portion and an annular outside portion so closely related as to supplement each other and give the effect of a single beam. Further, all of the light emitted from the source 10 is utilized, since all of that intercepted by the lens 25 or reflector 28 is included in the inner beam, and all rays intercepted by the reflector 16 or the reflectors 21, 22 or 23, are included in the exterior annular beam.

In practice, this means, of course, that a beam of great intensity may be obtained by the use of light sources of relatively low candle power. It follows that the absorption of light rays by the reflecting surfaces will be comparatively small as compared with absorption by non-reflecting surfaces, with the result that a comparatively small amount of heat will be generated in the casing of the lamp. It is to be noted, however, that all of the reflectors are spaced apart from the casing to provide ventilating channels and permit a free flow of air between the several units of the structure and, if desired, the casing 12 may be provided with vent openings, not shown, to dispel the small degree of heat that may be generated.

As thus far described, the projector has been utilized only for the purpose of developing a single parallel ray beam. If it is desired, however, to use the projector as a flood light, the light source 10 may be adjusted forwardly or rearwardly of the focal center F to cause the rays being emitted from the projector to diverge into a cone-shaped flood of light.

While I have shown and described a preferred embodiment of the present invention, in compliance with the patent statutes, I am aware that it is subject to numerous modifications without departing from the invention spirit, and I therefore wish to be limited only by the scope of the appended claim in view of the art.

Having thus described my invention, what I claim as new and desire to secure by Letters Patent is:

In an illuminating device, a projector including a housing, a parabolic reflector in said housing, a light source positioned at the focal point of said reflector and in the plane of the forward edge of the reflector and arranged to be adjusted along the central axis of the reflector, a condensing lens adjacent the light source and on the opposite side of the light source from the aforementioned reflector, said condensing lens having its center of focus coincident with the center of focus of the parabolic reflector and being in fixed position with respect to said reflector, whereby adjustments of the position of the light source along the axis will simultaneously focus the beam projected from the parabolic reflector and the beam projected through the condensing lens; a spherical reflector interposed between the light source and the aforementioned parabolic reflector, the said spherical reflector having its axis coincident with the axis of the parabolic reflector and of the condensing lens and having its center of curvature coincident with the light source; a plurality of annular spherical reflecting surfaces complementary to the parabolic reflector, in front of said parabolic reflector and outside of its maximum dimensional limits, together with mounting means for the light source and the last-mentioned spherical reflector, said mounting means comprising a shiftable frame having an incandescent bulb socket fixedly secured thereto and a bracket for supporting the aforementioned spherical reflector in constant spaced relationship with said socket; a fixed fulcrum on the reflector housing, and a focusing arm supporting the aforementioned frame on said fixed fulcrum, together with a pair of adjusting screws threaded in said focusing arm, one on each side of the fulcrum; each of said screws extending through the wall of the housing and having a head outside the housing whereby the arm may be adjustably rocked on said fulcrum to focus the projector.

CLARENCE W. CLARKSON.